US010666870B2

(12) United States Patent
Sudo

(10) Patent No.: US 10,666,870 B2
(45) Date of Patent: May 26, 2020

(54) IMAGE PROCESSING APPARATUS FOR GENERATING CORRECTION INFORMATION, IMAGE PROCESSING METHOD FOR GENERATING CORRECTION INFORMATION, AND RECORDING MEDIUM

(71) Applicant: CANON KABUSHIKI KAISHA, Tokyo (JP)

(72) Inventor: Takayuki Sudo, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 94 days.

(21) Appl. No.: 15/785,810

(22) Filed: Oct. 17, 2017

(65) Prior Publication Data

US 2018/0115695 A1 Apr. 26, 2018

(30) Foreign Application Priority Data

Oct. 24, 2016 (JP) ................................ 2016-208035

(51) Int. Cl.

| | |
|---|---|
| ***H04N 5/235*** | (2006.01) |
| ***H04N 9/64*** | (2006.01) |
| ***H04N 9/69*** | (2006.01) |
| ***G06T 5/00*** | (2006.01) |

(52) U.S. Cl.

CPC .......... *H04N 5/2353* (2013.01); *G06T 5/009* (2013.01); *H04N 5/2351* (2013.01); *H04N 5/2352* (2013.01); *H04N 9/646* (2013.01); *H04N 9/69* (2013.01)

(58) Field of Classification Search

CPC ...... H04N 5/2353; H04N 5/2352; H04N 9/69; H04N 9/646; H04N 5/2351; G06T 5/009

See application file for complete search history.

(56) References Cited

U.S. PATENT DOCUMENTS

| | | | | |
|---|---|---|---|---|
| 6,731,797 | B2 | 5/2004 | Prentice | |
| 7,199,840 | B2 * | 4/2007 | Shiota | G06T 5/009 348/672 |
| 9,307,137 | B2 * | 4/2016 | Ito | H04N 5/23212 |
| 2017/0148142 | A1 * | 5/2017 | Park | H04N 5/23229 |

FOREIGN PATENT DOCUMENTS

| | | | |
|---|---|---|---|
| CN | 1627323 | A | 6/2005 |
| CN | 101394484 | B | 5/2013 |
| CN | 104113699 | A | 10/2014 |
| JP | 2008-187590 | A | 8/2008 |

* cited by examiner

*Primary Examiner* — Padma Haliyur

(74) *Attorney, Agent, or Firm* — Canon U.S.A., Inc. IP Division

(57) ABSTRACT

An image processing apparatus includes an image processing unit configured to generate a first video signal for a first display apparatus, a correction unit configured to generate, when the first video signal is displayed on a second display apparatus operative to represent a brightness range narrower than a brightness range representable by the first display apparatus, correction information for correcting brightness of the video, and a recording unit configured to associate the correction information generated by the correction unit with the first video signal and hold the associated information.

13 Claims, 8 Drawing Sheets

GAMMA CHARACTERISTICS OF CAMERA

I/O CHARACTERISTICS OF MONITOR A

I/O CHARACTERISTICS OF MONITOR B

IMAGE PROCESSING APPARATUS FOR GENERATING CORRECTION INFORMATION, IMAGE PROCESSING METHOD FOR GENERATING CORRECTION INFORMATION, AND RECORDING MEDIUM

BACKGROUND

Field of the Disclosure

The present disclosure relates to an image processing technique for correcting a video image so that the video image will have suitable brightness when displayed on a display apparatus which represents a different brightness range.

Description of the Related Art

In recent display apparatuses, video output performances have been improved. There have been developed display apparatuses that can represent a wide dynamic range, which is close to that of an actual subject. For example, technique (an absolute brightness display mode) for allowing viewers to enjoy more realistic videos has been proposed. According to this technique, a subject is displayed with its actual brightness. Namely, an imaging apparatus performs imaging while adjusting the absolute brightness value of a subject to the brightness value of the subject displayed on a display apparatus. When a display apparatus having a wide dynamic range outputs a video captured in the absolute brightness display mode, the image is displayed with the brightness equivalent to that of the actual subject. Thus, the video can give viewers more realistic feeling. Japanese Patent Application Laid-Open No. 2008-187590 proposes a technique in which a user can capture a primary subject and background with respective appropriate brightness values by giving a single imaging instruction.

However, when a display apparatus having a dynamic range narrower than that of an actual subject outputs a video captured in the absolute brightness display mode, since the video to be viewed is displayed with lower brightness, the displayed video appears dark. The displayed video appears relatively darker than a video image captured by using conventional automatic exposure control processing. In such cases, image editing software can be used to check the video on a monitor and correct the brightness. However, since a correction amount for achieving appropriate brightness differs depending on the brightness and contrast of an individual subject, editing needs to be made for each captured scene, which is a time-consuming process. In addition, Japanese Patent Application Laid-Open No. 2008-187590 does not consider a case in which a video captured for displaying with absolute brightness is output on a display apparatus having a narrower dynamic range than that of an actual subject.

SUMMARY

According to an aspect of the present invention, an image processing apparatus includes an image processing unit configured to generate a first video signal for a first display apparatus, a correction unit configured to generate, when the first video signal is displayed on a second display apparatus operative to represent a brightness range narrower than brightness range representable by the first display apparatus, correction information for correcting brightness of the video, and a recording unit configured to associate the correction information generated by the correction unit with the first video signal and hold the associated information.

Further features of the present invention will become apparent from the following description of exemplary embodiments with reference to the attached drawings.

DESCRIPTION OF THE EMBODIMENTS

Hereinafter, an exemplary embodiment of the present invention will be described in detail. The exemplary embodiment described below is an example for realizing the present invention. As needed, modifications on changes could be made to the exemplary embodiment, based on a configuration of an apparatus to which the present invention is applied or on various conditions. Namely, the present invention is not limited to the following exemplary embodiment. In addition, parts of the exemplary embodiment described below may be combined as needed.

<Configuration of Apparatus>

First, a configuration and functions of a digital video camera 100 according to the present exemplary embodiment will be described with reference to FIG. 1.

Figure 1:
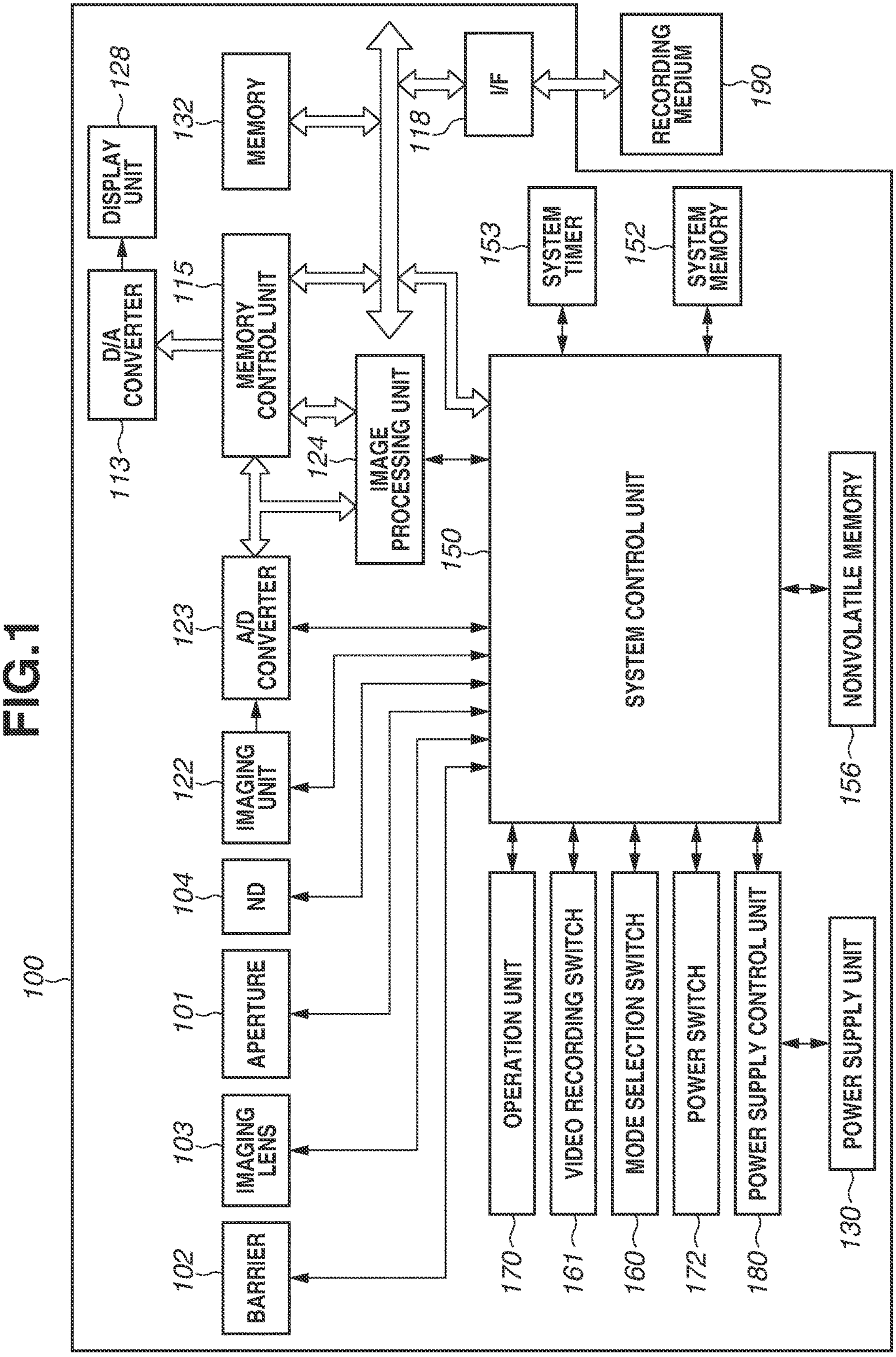
FIG. 1 is a block diagram illustrating a configuration of a digital video camera according to an exemplary embodiment.

In FIG. 1, imaging lenses 103 are a group of lenses including a zoom lens and a focus lens and form an image of a subject. An aperture 101 is used to adjust the quantity of incident light. A neutral density (ND) filter 104 is used to adjust (reduce) the quantity of incident light in a manner different from the aperture 101. An imaging unit 122 is an imaging sensor including a charge-coupled device (CCD) and a complementary metal-oxide-semiconductor (CMOS), which converts an optical image of a subject into an electric signal. In addition, the imaging unit 122 has various functions, such as controlling the accumulation by an electronic shutter and changing an analog gain and a reading speed. An analog-to-digital (A/D) converter 123 converts an analog signal into a digital signal. The A/D converter 123 is used to convert an analog signal output from the imaging unit 122 into a digital signal. A barrier 102 covers the imaging system including the imaging lenses 103, the aperture 101, and the imaging unit 122 of the digital video camera 100 (which will hereinafter be referred to as a camera 100), to prevent soiling of and damage to the imaging system.

An image processing unit 124 performs color conversion processing, gamma correction processing, digital gain addition processing, and the like on data from the A/C converter 123 or data from a memory control unit 115. In addition, the image processing unit 124 performs predetermined calculation processing by using captured image data. Based on the calculation result, a system control unit 150 performs exposure control processing, ranging control processing, white balance (WB) control processing, and the like. Accordingly, for example, autofocus (AF) processing, automatic exposure (AE) processing, and automatic white balancing (AWE) processing based on a through-the-lens (TTL) method are performed. The image processing unit 124 will be described in detail below.

Output data from the A/D converter 123 is directly written into a memory 132 via the image processing unit 124 and the memory control unit 115 or via the memory control unit 115. Image data is captured by the imaging unit 122 and is converted into digital data by the A/D converter 123. The memory 132 holds the digital data. In addition, the memory 132 holds image data to be displayed on a display unit 128. The memory 132 has a sufficient storage capacity for storing moving images and sound for a predetermined time.

In addition, the memory 132 serves as a memory (a video memory) for image display. A digital-to-analog (D/A) converter 113 converts image display data stored in the memory 132 into an analog signal and supplies the analog signal to the display unit 128. In this way, the image data written in the memory 132 is displayed by the display unit 128 via the D/A converter 113. The display unit 128 displays an image on a display device such as a liquid crystal display (LCD) based on an analog signal from the D/A converter 113. More specifically, the A/C converter 123 converts analog signals into digital signals, and the D/A converter 113 converts the digital signals accumulated in the memory 132 into analog signals and sequentially forwards the converted analog signals to the display unit 128. The display unit 128 sequentially displays the analog signals. In this way, the display unit 128 can function as an electronic view finder (EVF) and display live view images.

A non-volatile memory 156 is an electrically erasable and recordable memory. For example, an electrically erasable programmable read-only memory (EEPROM) is used as the non-volatile memory 156. The non-volatile memory 156 holds constants, programs, etc. for operations of the system control unit 150. These programs are used for executing various flowcharts, which will be described below in the present exemplary embodiment.

The system control unit 150 comprehensively controls the camera 100. By executing the programs stored in the non-volatile memory 156, the system control unit 150 realizes the following processing of the present exemplary embodiment. A random access memory (RAM) is used as a system memory 152. For example, the system control unit 150 loads constants, variables, and programs for operations of the system control unit 150 from the non-volatile memory 156 and expands the loaded constants, variables, and programs in the system memory 152. In addition, by controlling the memory 132, the D/A converter 113, the display unit 128, etc., the system control unit 150 performs display control processing.

A system timer 153 is a timer that measures time used for various kinds of control processing and time of an individual internal clock.

A mode selection switch 160, a video recording switch 161, and an operation unit 170 are operation units for inputting various operation instructions to the system control unit 150.

The mode selection switch 160 switches the operation mode of the system control unit 150 to any one of a moving image recording mode, a still image recording mode, a playback mode, etc. The moving image recording mode and the still image recording mode include an automatic shooting mode, an automatic scene determination mode, a manual mode, various scene modes each of which is set depending on the scene to be captured, a program AE mode, and a custom mode. By operating the mode selection switch 160, the user can directly switch the current mode to any one of these modes included in the moving image recording mode. Alternatively, after the user switches to the mode to the moving image recording mode by operating the mode selection switch 160, the user may use a different operation component to switch the mode to any one of these modes included in the moving image recording mode. By operating the video recording switch 161, the user can switch between a stand-by state and an imaging state. When the user turns on the video recording switch 161, the system control unit 150 starts a series of operations from reading a signal sent from the imaging unit 122 to writing video recording data to a recording medium 190.

By selecting various functional icons displayed on the display unit 128, the operation components of the operation unit 170 are assigned with functions appropriate to the individual scenes and serve as various function buttons. Examples of the function buttons include an end button, a back button, an image scrolling button, a jump button, a narrow-down button, and an attribute change button. For example, when the user presses a menu button, the display unit 128 displays a menu screen on which various settings can be made. The user can intuitively make various settings by using the menu screen displayed on the display unit 128, a four-direction (left, right, top, and bottom) button, and a SET button.

A power supply control unit 180 includes a battery detection circuit, a direct current (DC)-DC converter, and a switch circuit for switching blocks to be energized and detects whether a battery is mounted, the type of the battery, and the remaining battery capacity. In addition, the power supply control unit 180 controls the DC-DC converter based on the detection result and an instruction from the system control unit 150 and supplies a necessary voltage to various units including the recording medium 190 for a necessary period of time.

A power supply unit 130 includes a primary battery such as an alkaline battery or a lithium battery, a secondary battery such as a nickel-cadmium (NiCd) battery, a nickel-metal hydride (NiMH) battery or a lithium (Li) ion battery, an alternating current (AC) adaptor, etc. An interface (I/F) 118 is connected to the recording medium 190 such as a memory card or a hard disk or to an external apparatus. In FIG. 1, the I/F 118 is connected to the recording medium 190. The recording medium 190 is a medium such as a memory card on which captured images are recorded. The recording medium 190 may include a semiconductor memory, or a magnetic disk.

<Internal Configuration of Image Processing Unit>

Next, an internal configuration of the image processing unit 124 according to the present exemplary embodiment will be described with reference to FIG. 2A.

Figure 2A:
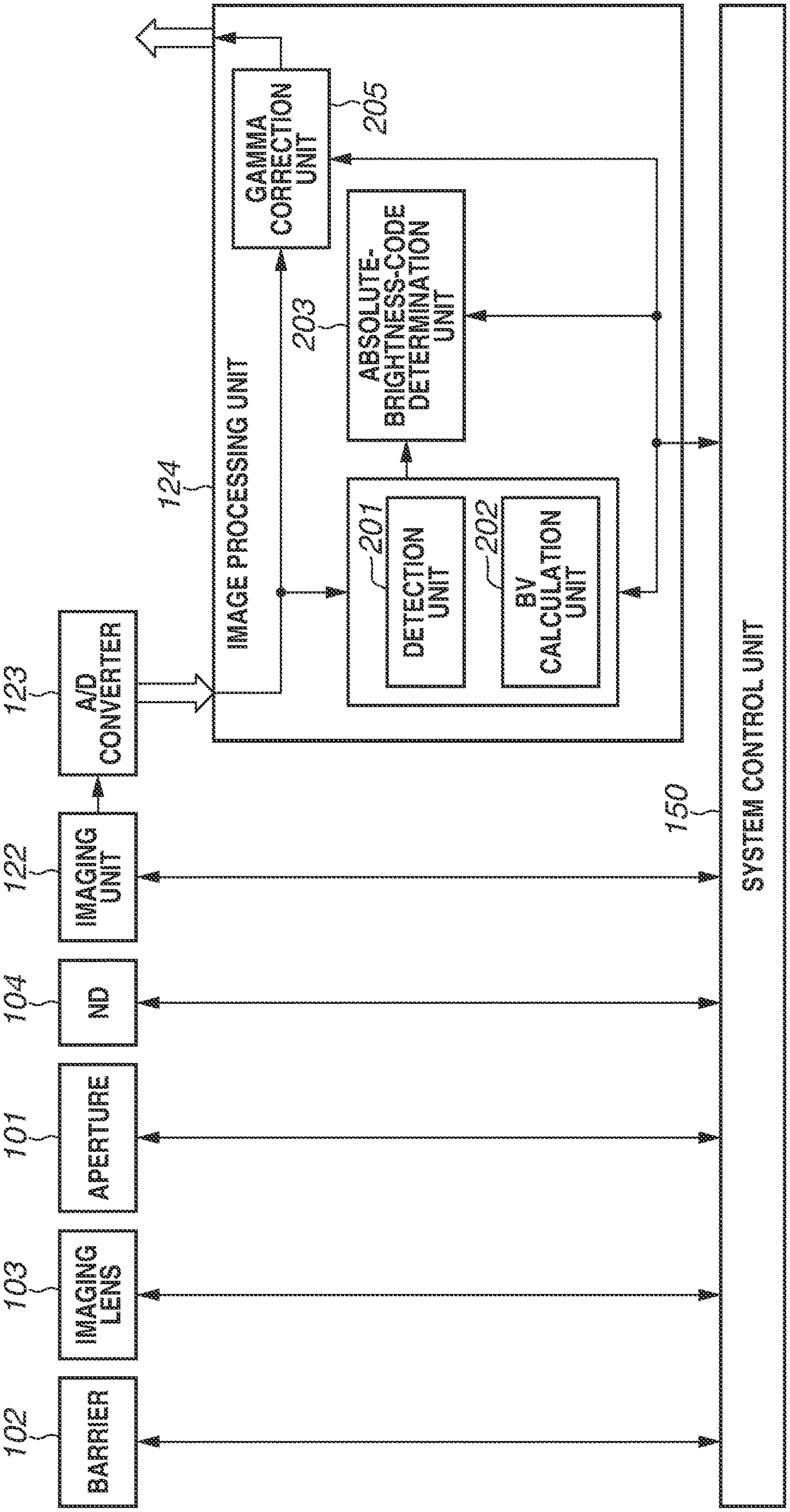
FIGS. 2A and 2B are block diagrams illustrating internal configurations of an image processing unit and a system control unit, respectively, according to the exemplary embodiment.
Figure 2B:
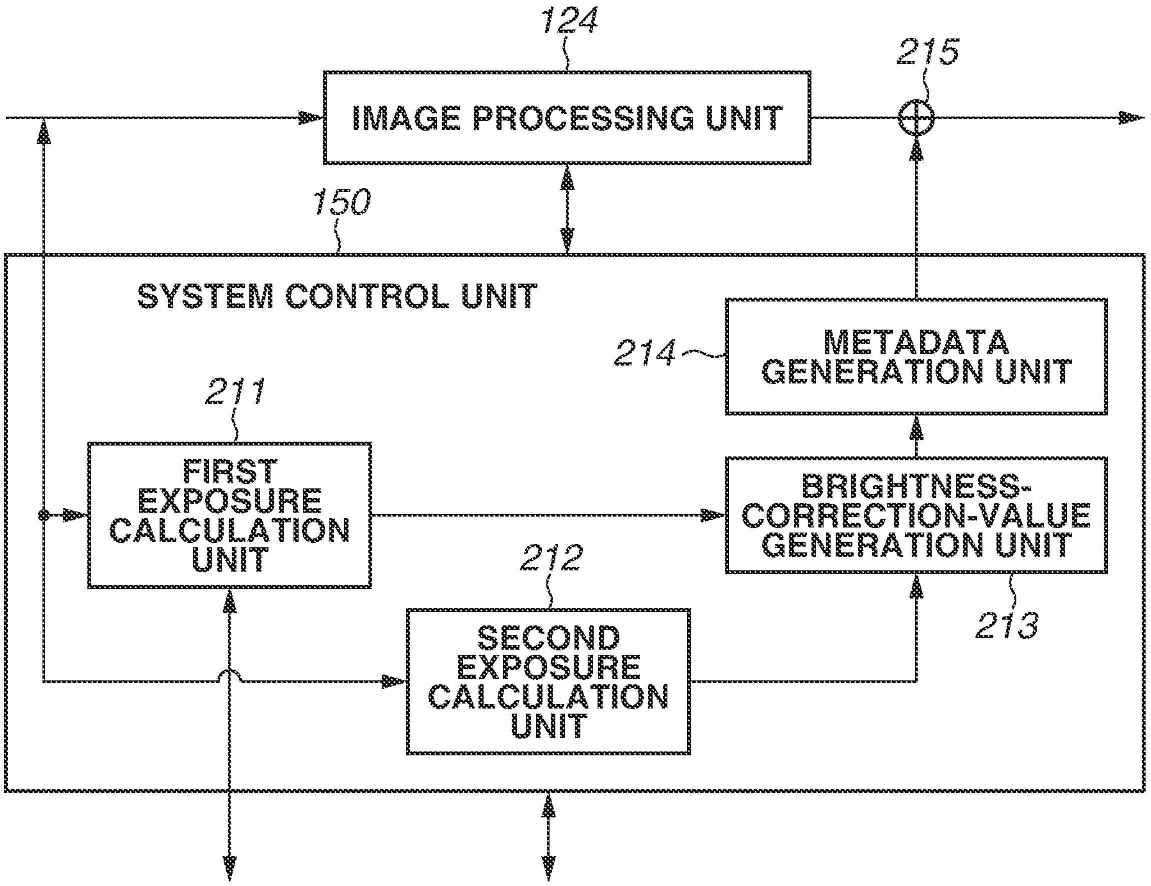

FIG. 2A illustrates peripheral units of the image processing unit 124 and an internal configuration thereof. Description of the WB control processing and sharpness control processing normally performed by the image processing unit 124 will be avoided. Functional blocks included in the image processing unit 124 can acquire various kinds of data used in the camera 100, including elements needed for exposure control processing (exposure parameters), such as the aperture, ND information (information about the density of the ND filter, etc.), International Standards Organization (ISO) sensitivity, gain, and shutter speed via the system control unit 150.

In FIG. 2A, the detection unit 201 detects data from the A/D converter 123 or data from the memory control unit 115 and obtains a representative value of the data. A brightness value (BV) calculation unit 202 calculates a BV (an absolute brightness value) from a reference signal, the aperture, the ISO sensitivity, the gain, the shutter speed, and the representative value acquired by the detection unit 201.

An absolute-brightness-code determination unit 203 acquires input/output (I/O) characteristics of a display apparatus from the non-volatile memory 156 or the memory control unit 115. Next, the absolute-brightness-code determination unit 203 determines an absolute brightness code such that the brightness value (output brightness) output by the display apparatus matches the BV (the absolute brightness value) calculated by the BV calculation unit 202 based on the I/O characteristics of the display apparatus. The I/O characteristics of the display apparatus may previously be stored in the non-volatile memory 156 or may be input by the user. Alternatively, the I/O characteristics may be acquired from the display apparatus being connected. The acquisition method is not particularly limited.

A gamma correction unit 205 performs gamma correction on data from the A/D converter 123 or data from the memory control unit 115.

<Internal Configuration of System Control Unit>

Next, an internal configuration of the system control unit 150 according to the present exemplary embodiment will be described with reference to FIG. 23.

FIG. 23 illustrates peripheral units of the system control unit 150 and an internal configuration thereof. A first exposure calculation unit 211 acquires gamma characteristics from the gamma correction unit 205 and acquires a determined absolute brightness code from the absolute-brightness-code generation unit 203. Based on the acquired information, the first exposure calculation unit 211 determines a first exposure control amount for outputting a video with absolute brightness from the display apparatus. The system control unit 150 performs exposure control processing based on the determined first exposure control amount.

Based on a target brightness value of the face of a person, the average brightness of the entire imaging plane, and the like stored in the non-volatile memory 156, a second exposure calculation unit 212 calculates an exposure control amount so that the brightness of a relevant subject falls within a predetermined target range.

A brightness-correction-value generation unit 213 generates a brightness correction value, which is used as correction information for correcting the brightness of a video so that the video will have brightness suitably displayed by a display apparatus having a brightness range different from what assumed when the camera 100 has captured the video. A metadata generation unit 214 generates recorded data from the brightness correction value generated by the brightness-correction-value generation unit 213. A signal superimposition unit 215 superimposes the recorded data generated by the metadata generation unit 214 onto a video signal processed by the image processing unit 124.

<Image Processing>

Next, image processing according to the present exemplary embodiment will be described.

The following example will be described assuming that the video outputting display apparatus is a display apparatus (a monitor A) having a wide dynamic range that can represent a first brightness range, which is close to the brightness of a subject, and that a video is captured in the absolute brightness display mode. The following example also assumes that a viewer watches the video on a display apparatus (a monitor B) having a dynamic range that can represent a second brightness range, which is narrower than the first brightness range. Thus, a brightness correction value is generated to correct the brightness of the video captured in the absolute brightness display mode so that the video will be displayed with brightness equivalent to that of a video captured in conventional automatic exposure control processing. The generated brightness correction value is associated and stored as metadata.

In the conventional automatic exposure control processing, exposure parameters are adjusted so that the output brightness of a relevant subject falls within a predetermined target range. For example, exposure control processing is performed so that, for example, the face of a person is continuously displayed with approximately 70% of the maximum output brightness representable by the display apparatus. By performing this control processing, even if the display apparatus has a narrow dynamic range, the output brightness of the face of the person can always be displayed with suitable brightness for the display apparatus of the narrow dynamic range. Hereinafter, a mode in which a camera captures and stores a video such that the output brightness of the relevant subject maintains at a brightness level suitable for another display apparatus having a different brightness range will be referred to as a relative brightness display mode.

Next, image processing performed in the absolute brightness display mode according to the present exemplary embodiment will be described with reference to FIG. 3.

Figure 3:
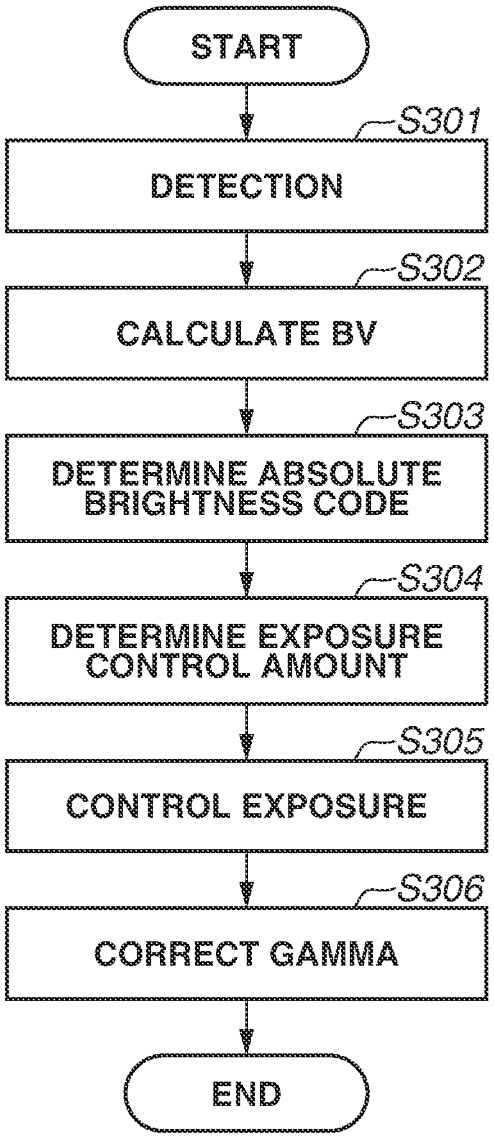
FIG. 3 is a flowchart illustrating image processing according to the exemplary embodiment.

The processing in FIG. 3 is realized when the system control unit 150 expands a program stored in the non-volatile memory 156 in the system memory 152 and executes the program.

In step S301, the system control unit 150 causes the detection unit 201 to detect data from the A/D converter 123 or data from the memory control unit 115. By performing this detection, the detection unit 201 obtains a representative value of the data. The detection unit 201 obtains the representative value, for example, calculating the average brightness of a center portion, calculating the average brightness of a certain subject such as a face, or acquiring the brightness of a designated point. The detection unit 201 may obtain the representative value by using a different method. Selecting a detection target requires caution. Namely, since the dynamic range of the camera 100 could change when exposure control processing is performed later, it could be better to select a detection target that can be detected even after the dynamic range is changed. For example, thresholds for upper and lower limits may be set based on the dynamic range of the camera 100, and a target that falls between the thresholds may be determined as a selection target.

In step S302, the system control unit 150 causes the BV calculation unit 202 to calculate a BV (an absolute brightness value) of the representative value. For example, the BV may be calculated from the reference signal, the aperture, the ISO sensitivity, the gain, the shutter speed, and the representative value acquired by the detection unit 201. The BV of a reference signal, i.e., a reference BV, in the Additive System of Photographic Exposure (APEX) expression is obtained by expression 1.

$$\text{Reference BV}=2^{(Av+Tv-Sv)}\times(0.32\times k)[\text{cd/m}^2] \quad \text{(Expression 1)}$$

Expression 1 includes an aperture value Av, a shutter speed Tv, and an exposure control value Sv obtained by converting imaging sensitivity into an APEX unit. Expression 1 also includes a calibration coefficient k. To obtain an input of 18% gray, the calibration coefficient k is used when a brightness value expressed in an APEX unit is converted into cd/m$^2$ (or nit), which is the unit of the absolute brightness. In the present exemplary embodiment, the calibration coefficient k is set to 12.5. A brightness value Z expressed in the APEX unit can be converted into an absolute brightness value X, based on a relational expression $\log_2(X/0.32\times k)=Z$. Namely, the absolute brightness value X is calculated by $2^Z\times(0.32\times k)$. For example, when Av=F4.0, Tv=1/128, Sv=ISO sensitivity 200, the reference BV is calculated by expression 1.

$$\text{Reference BV}=2^{4(Av)+7(Tv)-6(Sv))}\times(0.32\times12.5)=128\ [\text{cd/m}^2]$$

A reference signal code is calculated by expression 2.

$$\text{Reference signal code}=(2^{bit\ number})\times(\text{reference brightness value [\%]/dynamic range [\%]}) \quad \text{(Expression 2)}$$

When the dynamic range of the camera 100 is 1200%, the ratio of the reference brightness value to the upper limit of the brightness value is 20%, and the bit number of the data is 14, the reference signal code can be calculated as follows:

$$\text{Reference signal code}=(2^{14})\times(20/1200)=273.$$

When the representative value code is 2132 and the absolute brightness value X is the difference between the BV of the representative value and the reference BV, the following equation is established.

$$\text{Representative value code}=\text{Reference signal code}\times(2^X) \quad \text{(Expression 3)}$$

By substituting the above values into expression 3, the following equation is established.

$$2132=273\times(2^X)$$

$$X=2.96$$

Thus, the BV of the representative value is calculated as follows:

$$\text{BV of the representative value}=2^{2.96}\times128\ [\text{cd/m}^2]=1000\ [\text{cd/m}^2]$$

The above calculation method is merely an example, and the present exemplary embodiment is not limited thereto. A different method may be used to obtain the BV of the representative value. Further, the BB may be calculated from a signal acquired from an external sensor or the like.

Figure 4A:
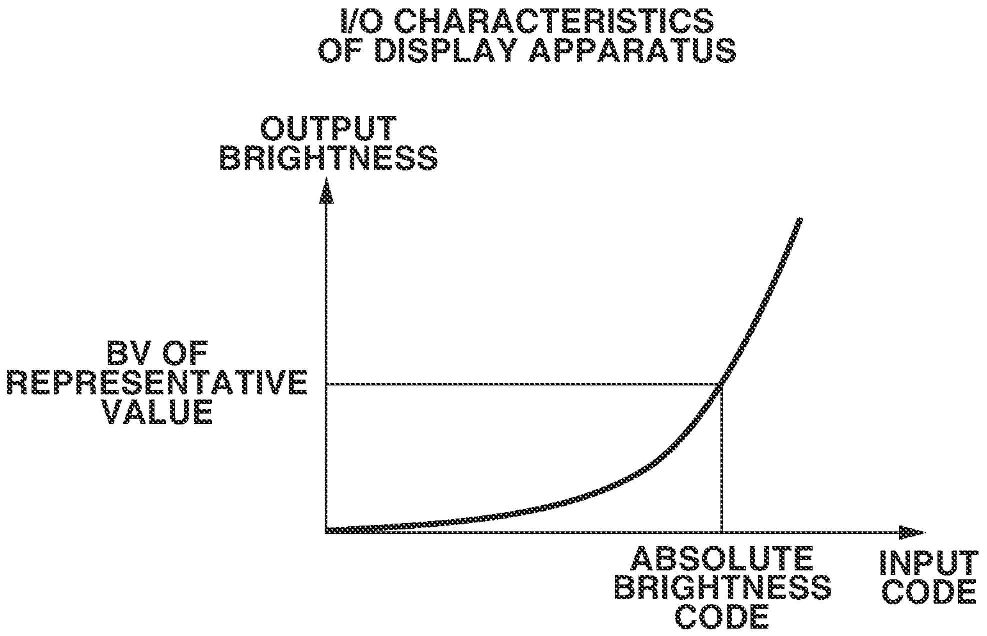
FIGS. 4A and 4B illustrate input/output (I/O) characteristics of a display apparatus and gamma characteristics of a video, respectively, according to the exemplary embodiment.

In step S303, the system control unit 150 causes the absolute-brightness-code generation unit 203 to determine an absolute brightness code such that the output brightness matches the BV of the representative value. For example, the absolute brightness code is calculated based on the I/O characteristics of the display apparatus and the BY of the representative value calculated in step S302. FIG. 4A illustrates a relationship between the BV of the representative value and the I/O characteristics of the display apparatus. In the case of the I/O characteristics of the display apparatus illustrated in FIG. 4A, the absolute-brightness-code generation unit 203 determines a unique input code such that the output brightness matches the BV of the representative value. The absolute brightness code may be obtained from the function as in FIG. 4A or may be calculated by an expression of the I/O characteristics and the BV of the representative value. Alternatively, an I/O relationship may be held as table data, and the absolute brightness code may be selected from the table data based on the BV of the representative value. The determination method according to the present exemplary embodiment is not limited to these methods. Namely, a different method may be applicable.

Figure 4B:
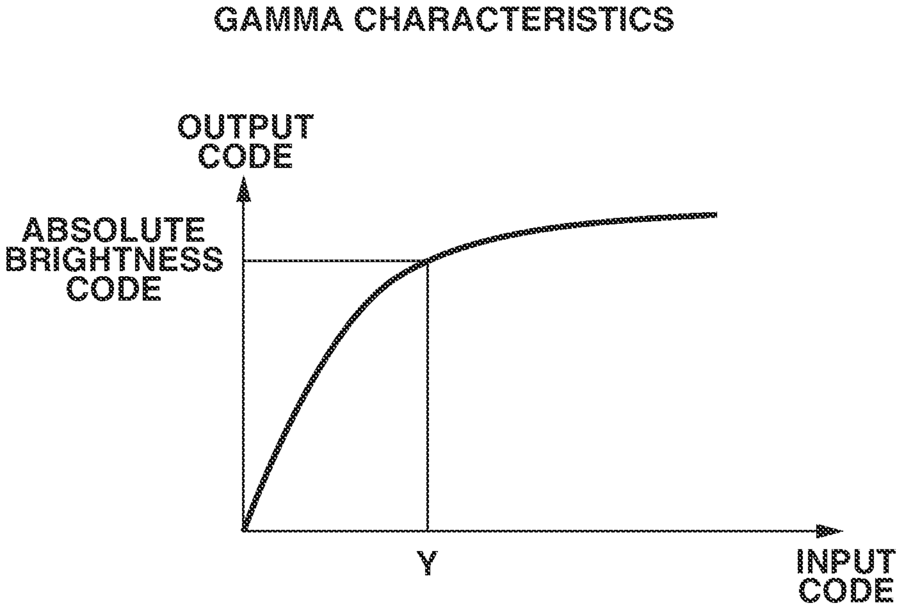

In step S304, the first exposure calculation unit 211 in the system control unit 150 calculates a signal conversion coefficient based on the absolute brightness code determined in step S303. The first exposure calculation unit 211 calculates an exposure control amount to match the output from the gamma correction unit 205 with the absolute brightness code for the representative value. For example, the first exposure calculation unit 211 acquires gamma characteristics from the gamma correction unit 205 and calculates a first exposure control amount based on the gamma characteristics. FIG. 4B illustrates the gamma characteristics. According to these gamma characteristics, when the input code is Y, the output code matches with the absolute brightness code. If the gamma characteristics are inverse gamma characteristics with respect to the I/O characteristics of the display apparatus and when the data is a representative value, an exposure control amount for matching the output code with the absolute brightness code is calculated by expression 4.

$$\text{Exposure control amount}=Y/\text{representative value} \quad \text{(Expression 4)}$$

In the example described in the present exemplary embodiment, the gamma characteristics have the inverse gamma characteristics. However, the present exemplary embodiment is not limited to such example. The gamma characteristics may have different characteristics.

In step S305, the system control unit 150 performs exposure control processing based on the exposure control amount calculated by the first exposure calculation unit 211. For example, if the exposure control amount is obtained by expression 4, the system control unit 150 performs exposure control processing by adding or subtracting the exposure control value to or from the current exposure control amount. As a specific example, if the exposure control amount is ½, the system control unit 150 closes the aperture by one step. The exposure control method may be changed depending on the exposure control amount. For example, if the exposure control amount is so large that the exposure is greatly changed, the exposure control value may be changed gradually over time, rather than changing the exposure control value at one time. In this way, the video could be displayed smoothly. In addition, in the present exemplary embodiment, the exposure parameters for calculating the exposure control amount are not particularly limited. The aperture setting, the ND information, the ISO sensitivity, the gain, or the shutter speed may be changed. Some of these values may be changed at the same time.

In step 306, the system control unit 150 causes the gamma correction unit 205 to perform gamma correction on data from the A/D converter 123 or data from the memory control unit 115.

By performing the above processing, the representative value of the target data is output from the camera 100 as the absolute brightness code, and by inputting the absolute brightness code to the display apparatus, the display apparatus displays the video with the BV of the representative value. Namely, the display apparatus can display the subject with the absolute brightness value. Thus, the user can enjoy video with realistic sensation.

Next, with reference to FIG. 3, image processing in the relative brightness display mode will be described in comparison with the image processing in the absolute brightness display mode.

In step S301, the system control unit 150 performs detection as in the absolute brightness display mode. A representative value may be obtained in the same way as in the absolute brightness display mode. Alternatively, a different subject or a different method may be used.

In step S302, the system control unit 150 calculates a BV of the representative value. If the first exposure calculation unit 211 does not use the BV later, the processing in step S302 may be omitted.

Since the absolute brightness code generation processing in step S303 is not needed in the relative brightness display mode, this processing is not carried out.

In step S304, the system control unit 150 calculates an exposure control amount. In the relative brightness display mode, the system control unit 150 calculates an exposure control amount so that the brightness of a certain subject reaches a target value previously determined based on the representative value. As an example, a case will be described in which the representative value is the brightness of a face and the target value displays the face at 70% of the output brightness. In this case, assuming that the gamma characteristics are inverse gamma characteristics of the I/O characteristics of the display apparatus and that the bit number of the data is 14, the exposure control amount is calculated by expression 5.

$$\text{Exposure control amount}=(70\%*(2^{14}))/\text{representative value} \quad \text{(Expression 5)}$$

In the above example, the target value is directly related to the representative value. However, the target value may be a value calculated from the representative value, for example, may be a value related to the BV. The relationship between the representative value and the target value is not particularly limited.

In step S305, the system control unit 150 performs exposure control processing based on the exposure control amount calculated by the first exposure calculation unit 211.

Step S306 is carried out as in the absolute brightness display mode.

Thus, the relative brightness display mode differs from the absolute brightness display mode in that the absolute-brightness-code determination processing is not performed and that the first exposure calculation unit 211 does not calculate the exposure control amount based on the absolute brightness code.

In the present exemplary embodiment, while the representative value is the brightness of a face, the representative value is not limited thereto. The average brightness value of the entire imaging plane may be used. Alternatively, a brightness evaluation value obtained by center-weighted photometry in which the weight near the center in the imaging area is increased may be used. In addition, an arbitrary value may be set as the target value, depending on the subject or imaging conditions.

In the above example according to the present exemplary embodiment, to facilitate understanding of the difference between the relative brightness display mode and the absolute brightness display mode, the first exposure calculation unit 211 also used in the relative brightness display mode. According to the present exemplary embodiment, in the absolute brightness display mode, the first exposure calculation unit 211 calculates an exposure control amount, and the exposure control processing performed when a video is captured is carried out by using the exposure control value calculated by the first exposure calculation unit 211 or an exposure control value specified by a user operation. In addition, in the relative brightness display mode, the second exposure calculation unit 212 calculates an exposure control amount. When a video is captured, the second exposure calculation unit 212 calculates an exposure control amount by acquiring a detection value from the detection unit 201 and a target value of the brightness of a relevant subject from the non-volatile memory 156.

Next, a case will be described in which a video captured in the absolute brightness display mode is output to the monitors A and B, which have different dynamic ranges, without applying any correction.

Figure 5A:
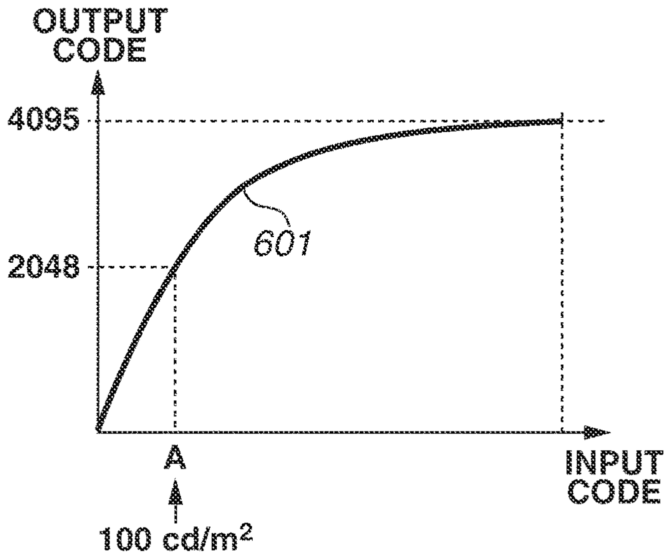
FIG. 5A illustrates gamma characteristics of a camera according to the exemplary embodiment.
Figure 5B:
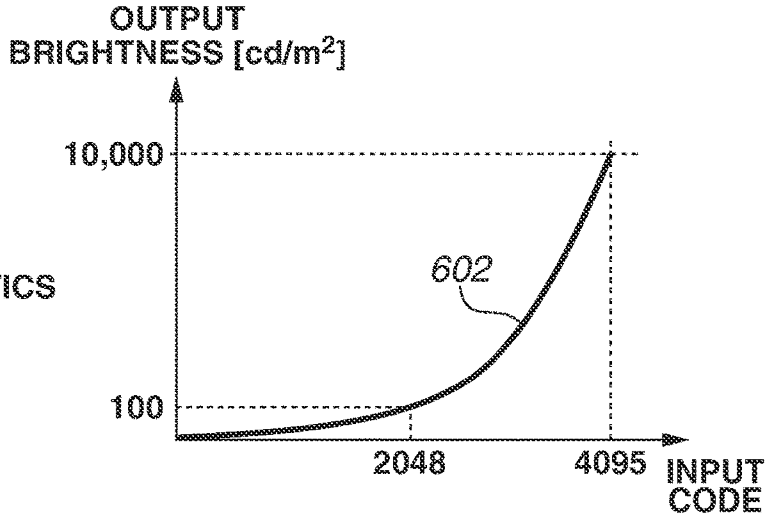
FIGS. 5B and 5C illustrate I/O characteristics of monitors A and B, respectively, according to the exemplary embodiment.
Figure 5C:
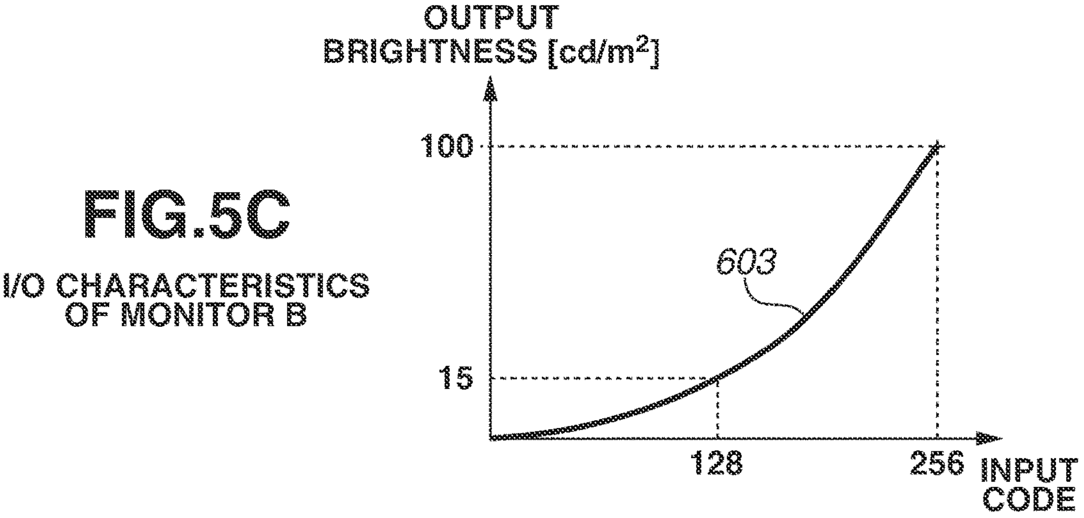

The description will be made based on the following conditions. The monitor A has a maximum output brightness of 10000 cd/m$^2$, and the bit number of the data is 12. The monitor B has a maximum output brightness of 100 cd/m$^2$, and the bit number of the data is 8. The bit number of the data of the camera gamma is 12. The I/O characteristics of the monitor A are inverse gamma characteristics of the camera gamma, and the I/O characteristics of the monitor B is γ2.2. A subject is the face of a person, and the absolute brightness value of the subject is 100 cd/m$^2$. FIG. 5A illustrates the gamma characteristics of the camera, and FIGS. 5B and 5C illustrate the I/O characteristics of the monitors A and B. More specifically, FIG. 5A illustrates gamma characteristics 601 of the camera. An input code A is an input code corresponding to when a face of 100 cd/m$^2$ is captured. FIGS. 5B and 5C illustrate the I/O characteristics 602 and 603 of the monitors A and B, respectively.

In the above absolute brightness display mode, the exposure processing of the camera and the video signal are controlled so that the video signal of the captured face area matches with the input code A of the camera gamma. In this way, the face area will be output with the brightness of 100 cd/m$^2$ on the monitor A.

First, the video output by the monitor A will be described. The input code A has been converted into an output code 2048 based on the camera gamma 601, and the output code 208 is stored. When the converted code value 2048 is input to the monitor A, the code value 2048 is converted based on the I/O characteristics 602 of the monitor A and output with 100 cd/m$^2$.

Next, the video output by the monitor B will be described. The input code A has been converted into the output code 2048 based on the camera gamma 601, and the output code 2048 is stored. When the converted code value 2048 is input to the monitor B, first, to convert the 12-bit signal into an 8-bit signal, the code value 2048 is divided by 16, and as a result, a code value 128 is obtained. The input code 128 is converted based on the I/O characteristics 603 of the monitor B and output with approximately 15 cd/m$^2$.

In this way, in the case of the monitor A, the video captured in the absolute brightness display mode is output to the monitor A in a state in which the absolute brightness value of the subject matches the brightness value of the subject displayed on the monitor A. However, in the case of the monitor B, the video is output to the monitor B with approximately 15 cd/m$^2$, which is rather dark. If the video is captured in the relative brightness display mode, the exposure is controlled to achieve 70% of the output brightness of the monitor B. Thus, the person's face is output with 70 cd/m$^2$ on the monitor B. Namely, the video appears darker than that displayed by using conventional automatic exposure control processing.

<Processing from Exposure Control Processing to Metadata Generation Processing>

Figure 6:
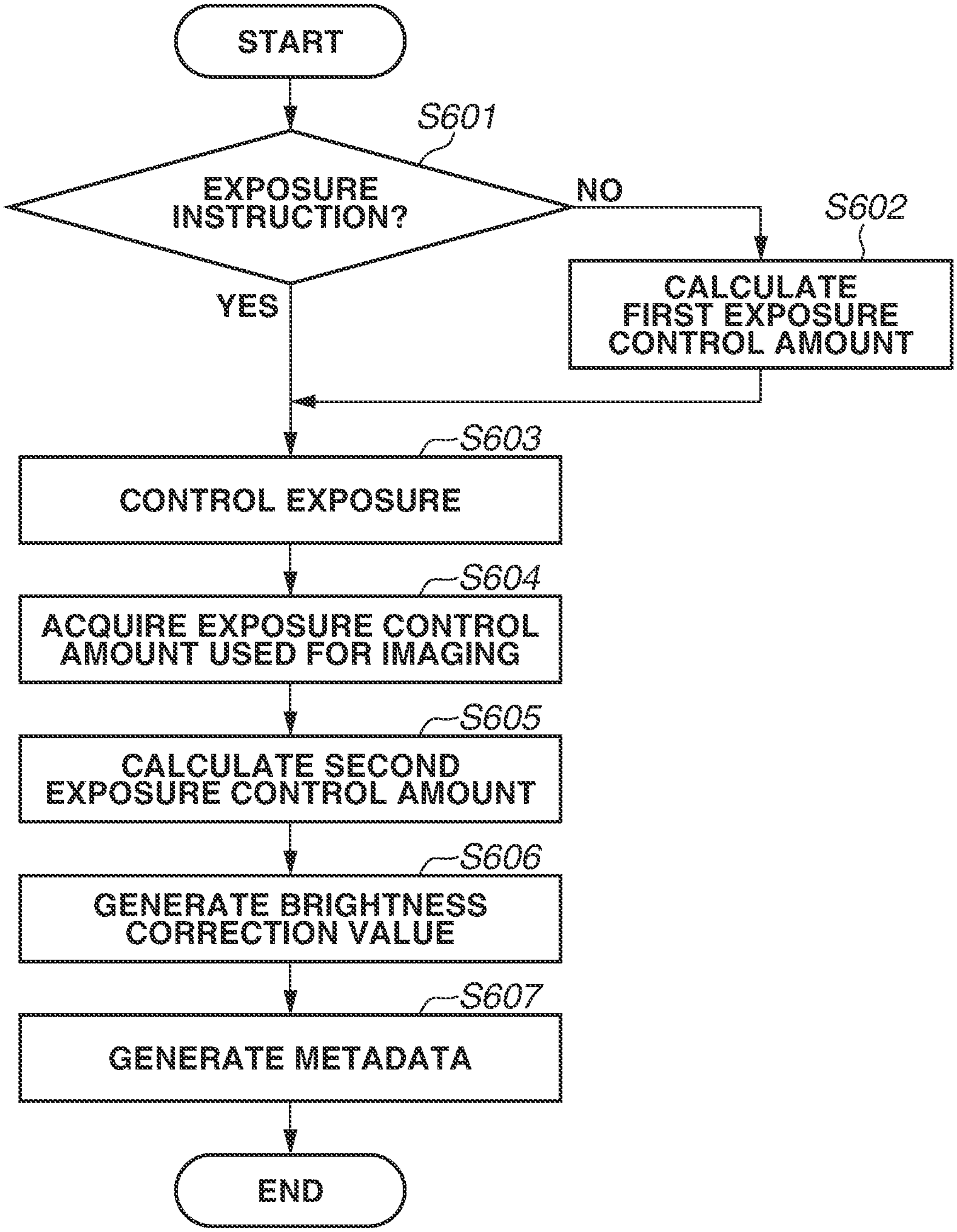
FIG. 6 is a flowchart illustrating processing from an exposure control process to a metadata generation process according to the present exemplary embodiment.

Next, processing from exposure control processing to metadata generation processing according to the present exemplary embodiment will be described with reference to FIGS. 6 and 7.

Figure 7:
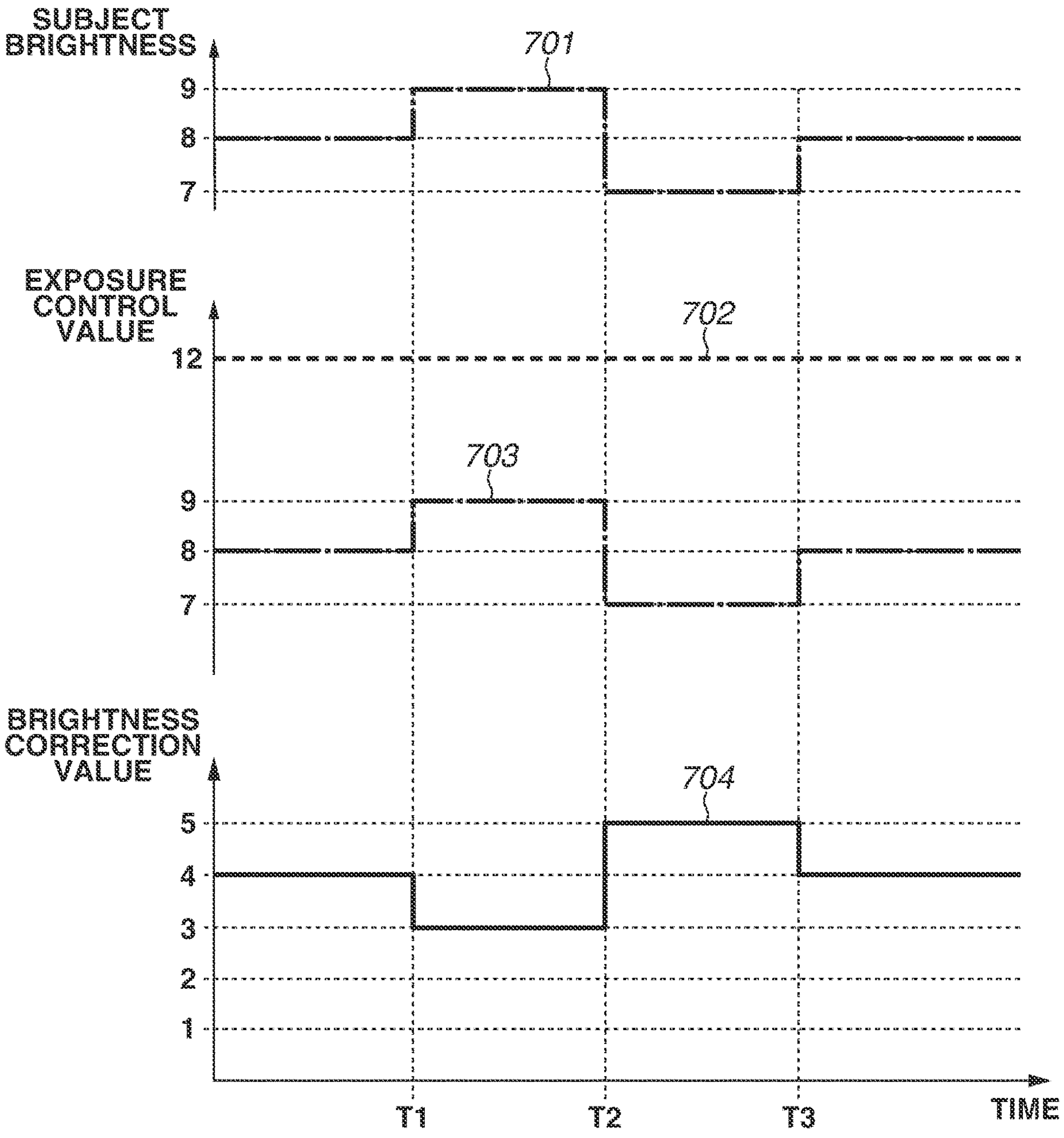
FIG. 7 illustrates how a subject brightness value, exposure control value, and a brightness correction value change with the passage of time according to the present exemplary embodiment.

FIG. 7 illustrates change of a subject brightness value, exposure control amounts, and a brightness correction value over time. FIG. 7 illustrates an average brightness value 701 of a face area as an imaging target subject, an exposure control amount 702 in the absolute brightness display mode, and an exposure control value 703 in the relative brightness control mode. FIG. 7 also illustrates a brightness correction value 704 for correcting brightness. When a video, which has been captured in the absolute brightness display mode to be displayed on the monitor A, is displayed on the monitor B, the brightness of the video is decreased on the monitor B. The brightness correction value 704 is used in such cases.

Next, as an example, a case will be described in which the brightness of a face as a subject changes over time as indicated by the average brightness value 701 in FIG. 7. In this example, the subject appears bright at timing T1, becomes darker at timing T2, and returns to the initial brightness at timing T3.

In step S601, the system control unit 150 determines whether a user has given an exposure instruction. The determination is made based on whether the user has manually operated the operation unit 170 and set a certain exposure level. If the user has specified any exposure setting, a corresponding exposure control value is added to the setting. If the user has given an exposure instruction (YES in step S601), the processing proceeds to step S603. If not (NO in step S601), the processing proceeds to S602.

In step S602, the first exposure calculation unit 211 of the system control unit 150 calculates a first exposure control amount, which is an exposure control value in the absolute brightness display mode. Next, the processing proceeds to step S603.

In step S603, the system control unit 150 performs the exposure control processing in the absolute brightness display mode. If the processing is carried out via step S602, the exposure control processing is performed using the first exposure control value. In the present exemplary embodiment, since the imaging is performed in the absolute brightness control mode, the first exposure control value is used during imaging. In addition, the exposure control amount is a sum of APEX values. When the aperture is F7.0, the shutter speed is 1/128, the ISO sensitivity is ISO 200, and the ND filter is off, the exposure control amount is obtained as follows:

$$11(F7.0)+7(1/128)-6(\text{ISO }200)+0(\text{ND Off})=12$$

In addition, as indicated by the exposure control amount 702, the exposure control amount in the absolute brightness display mode does not change while the brightness of the subject changes. In other words, the brightness of the subject is directly output to the monitor without changing the exposure control amount. Namely, the brightness value of the subject output to the monitor increases or decreases with the change of the brightness value of the subject. In the example in the present exemplary embodiment, the exposure is not changed. However, the present exemplary embodiment is not limited to this example. The exposure may be changed in view of gradation characteristics and the like.

In step S604, the system control unit 150 acquires an imaging exposure control amount, which is an exposure control amount during imaging. Detailed description of this processing will be avoided.

In step S605, the second exposure calculation unit 212 of the system control unit 150 calculates a second exposure control amount, which is an exposure control value in the relative brightness display mode. While the exposure control in the absolute brightness display mode is being performed, the brightness of the video image is detected, and the second exposure calculation unit 212 calculates a second exposure control amount in the relative brightness display mode. More specifically, the second exposure control amount is calculated such that the brightness of the face is maintained at approximately 70% of the output brightness of the monitor B. As indicated by the exposure control value 703, the second exposure control amount is changed according to the change amount of the brightness of the subject.

In step S606, the brightness-correction-value generation unit 213 of the system control unit 150 calculates the difference value between the imaging exposure control amount and the second exposure control amount and generates a brightness correction value based on the calculation result. In the present exemplary embodiment, since the first exposure control amount, which is an exposure control value in the absolute brightness display mode, has been used during imaging, the difference value is the difference between the first exposure control amount 702 and the second exposure control amount 703. The difference is the difference between the sums of the APEX values. Thus, the brightness correction value has characteristics as indicated by the brightness correction value 701 and increases and decreases over time. The brightness correction value is not limited to the difference between the exposure control amounts. A different brightness correction value may be used as long as the brightness correction value can correct the difference in the brightness values of videos caused by the difference between the output brightness ranges of the monitors.

In step S607, the metadata generation unit 214 of the system control unit 150 generates the brightness correction value generated by the brightness-correction-value generation unit 213 as metadata. Next, the signal superimposition unit 215 superimposes the metadata onto the video. A video signal on which the metadata has been superimposed is recorded in the recording medium 190.

<Brightness Correction Processing>

Next, brightness correction processing will be described with reference to FIG. 7. In this processing, the brightness of a video captured in the absolute brightness display mode is corrected based on the metadata stored in a video signal so that the video will have brightness to be suitably displayed by the monitor B.

Since the brightness correction value up to the timing T1 is level 4, the brightness is corrected by multiplying the video signal by a 16 times gain. Likewise, since the brightness correction value in the time between the timing T1 and the timing T2 is level 3, the brightness is corrected by multiplying the video signal by an 8 times gain. Likewise, since the brightness correction value in the time between the timing T2 and the timing T3 is level 5, the brightness is corrected by multiplying the video signal by a 32 times gain. Likewise, since the brightness correction value in the time after the timing T3 is level 4, the brightness is corrected by multiplying the video signal by a 16 times gain. The correction processing for multiplying the corresponding gains may be performed by the camera or the display apparatus. In addition, the correction processing may be performed by changing a lookup table (LUT) or gamma correction.

In this way, the present image processing apparatus can correct the brightness of a video captured in the absolute brightness display mode for display on the monitor A such that the video image will have brightness to be suitably displayed on the monitor B having a dynamic range narrower than that of the monitor A. Thus, for example, even when the maximum output brightness of the monitor B is 100 cd/$m^2$, since the video is displayed at 70 cd/$m^2$, which is 70% of the maximum output brightness, the face displayed does not appear dark. Accordingly, even when the brightness of the face changes due to change in brightness of a light source that illuminates the subject, this image processing apparatus can easily convert the brightness into suitable brightness that maintains the brightness value of the face displayed on the monitor at 70 cd/$m^2$.

In addition, in the relative brightness display mode, to avoid abrupt brightness change when the brightness is adjusted to a predetermined target value, responsiveness of the exposure control processing is adaptively changed according to an individual shooting scene. More specifically, an upper limit may be set to a step amount, which is an exposure control change amount per unit time. Alternatively, the step amount is changed according to the degree of deviation from the target value. For this purpose, information about the exposure control responsiveness may be generated as a brightness correction value, and the generated information may be associated and stored as metadata. The video brightness corrected for display on the monitor B may be adjusted based on this exposure control responsiveness.

In addition, in the relative brightness display mode, overexposure of a video can be reduced by changing the dynamic range based on the contrast and output brightness of an individual captured scene. More specifically, by changing a knee point of the gamma characteristics, a high-brightness area is compressed, and the dynamic range is expanded. Dynamic range information for display on the monitor B may be generated as a brightness correction value and stored as metadata. When the brightness of a video is corrected for display on the monitor B, the high-brightness area is compressed based on the dynamic range information to reduce overexposure. To avoid abrupt brightness change, as with the exposure control processing, responsiveness may be given to the dynamic range control processing. With respect to responsiveness of the dynamic range control processing, a brightness correction value may be generated and stored as metadata, and responsiveness of high-brightness compression performed on a video which is to be corrected for display on the monitor B may be changed.

The present exemplary embodiment has been described based on an example which calculates an exposure control value of a video captured in the absolute brightness display mode such that the video can be suitably displayed in the relative brightness display mode on a monitor having a narrower dynamic range. However, the present invention is not limited to this example. The present invention is applicable to any monitor having a different representable brightness range.

The present exemplary embodiment has been described assuming that the exposure control processing for display on the monitor A is performed in the absolute brightness display mode and the exposure control processing for display on the monitor B is performed in the relative brightness display mode. However, the exposure control method for display on a monitor is not limited to the above example. The exposure control may be performed in such a manner in which both the monitors A and B operate in the absolute brightness display mode or in which both the monitors A and B operate in the relative brightness display mode.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit. (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the above described exemplary embodiments, it is possible to correct brightness of a video image for a display apparatus which can make a representation in a wide brightness range, such that the brightness becomes suitable for a display apparatus which makes a representation in a narrower range.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-208035, filed Oct. 24, 2016, which is hereby incorporated by reference herein in its entirety.

What is claimed is:

1. An image processing apparatus comprising:
at least one processor configured to function as:
an image processing unit configured to generate a first video signal for a first display apparatus;
a first exposure calculation unit configured to calculate a first exposure control value when a video is captured for the first display apparatus;
a second exposure calculation unit configured to calculate a second exposure control value when the video is captured for a second display apparatus, which is a different apparatus from the first display apparatus and operative to represent a dynamic range narrower than a dynamic range represented by the first display apparatus;
a correction unit configured to generate, based on the first exposure control value and the second exposure control value, correction information for correcting brightness of the video when the first video signal is displayed on the second display apparatus; and a recording unit configured to associate the correction information generated by the correction unit with the first video signal and hold the associated information.

2. The image processing apparatus according to claim 1, wherein the at least one processor is further configured to function as following units:

an imaging unit configured to capture an image and generate a video signal; and an exposure control unit configured to control exposure at an imaging time;

wherein the exposure control unit performs exposure control processing at the imaging time based on the first exposure control value calculated by the first exposure calculation unit.

3. The image processing apparatus according to claim 2, wherein the first exposure calculation unit calculates the first exposure control value such that a brightness value of a relevant subject output on the first display apparatus is equivalent to an absolute brightness value of the relevant subject.

4. The image processing apparatus according to claim 2, wherein the first exposure calculation unit calculates the first exposure control value such that the brightness value of the relevant subject output on the first display apparatus falls within a predetermined target range.

5. The image processing apparatus according to claim 2, wherein the correction unit generates the correction information based on a difference between the first exposure control value and the second exposure control value.

6. The image processing apparatus according to claim 5, wherein the second exposure calculation unit calculates the second exposure control value such that a brightness value of the relevant subject output on the second display apparatus is equivalent to an absolute brightness value of the relevant subject.

7. The image processing apparatus according to claim 5, wherein the second exposure calculation unit calculates the second exposure control value such that the brightness value of the relevant subject output on the second display apparatus falls within a predetermined target range.

8. The image processing apparatus according to claim 1, wherein the correction unit generates dynamic range information for display on the second display apparatus as the correction information.

9. The image processing apparatus according to claim 1, wherein the correction unit generates information about responsiveness of change to a video signal in the dynamic range represented on the second display apparatus as the correction information.

10. The image processing apparatus according to claim 9, wherein the information about the responsiveness is a change amount of exposure control processing adaptively changed according to an individual captured scene or a change amount of dynamic range control processing.

11. The image processing apparatus according to claim 2, wherein the exposure control processing is performed by using at least one of an aperture, neutral density information, a sensitivity, a gain, and a shutter speed.

12. An image processing method comprising:

performing image processing in which a first video signal is generated for a first display apparatus;

a first exposure calculating in which a first exposure control value when a video is captured for the first display apparatus is calculated;

a second exposure calculating in which a second exposure control value when the video is capture for the second display apparatus is calculated, the second display apparatus being a different apparatus from the first display apparatus and operative to represent a dynamic range narrower than a dynamic range representable by the first display apparatus;

performing correction in which correction information for correcting brightness of a video when the first video signal is displayed on the second display apparatus is generated; and associating the generated correction information with the first video signal and storing the associated information.

13. A non-transitory computer-readable storage medium holding a program that causes a computer to function the following steps:

performing image processing in which a first video signal is generated for a first display apparatus;

a first exposure calculating in which a first exposure control value when a video is captured for the first display apparatus is calculated;

a second exposure calculating in which a second exposure control value when the video is captured for the second display apparatus is calculated, the second display apparatus being a different apparatus from the first display apparatus and operative to represent a dynamic range narrower than a dynamic range representable by the first display apparatus;

performing correction in which correction information for correcting brightness of a video when the first video signal displayed on the second display apparatus is generated; and associating the generated correction information generated in the correction with the first video signal and storing the associated information.

* * * * *